(12) United States Patent
Han (10) Patent No.: US 7,117,514 B2
(45) Date of Patent: Oct. 3, 2006

(54) MULTI-TUNER TELEVISION RECEIVING APPARATUS AND METHOD OF RESTRICTING THE VIEWING

(75) Inventor: Jong-Hee Han, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1032 days.

(21) Appl. No.: 09/780,673

(22) Filed: Feb. 12, 2001

(65) Prior Publication Data

US 2001/0025374 A1    Sep. 27, 2001

(30) Foreign Application Priority Data

Feb. 10, 2000    (KR) .................................. 2000-6163

(51) Int. Cl.
  *H04N 7/16* (2006.01)
  *H04N 5/74* (2006.01)
(52) U.S. Cl. .................. 725/25; 348/731; 348/528
(58) Field of Classification Search ............ 725/25–31; 380/205, 206, 210–213, 221; 348/528, 731
See application file for complete search history.

(56) References Cited

U.S. PATENT DOCUMENTS

| | | | |
|---|---|---|---|
| 3,684,823 A * | 8/1972 | McVoy | 725/25 |
| 3,885,089 A * | 5/1975 | Callais et al. | 380/220 |
| 4,769,838 A * | 9/1988 | Hasegawa | 380/209 |
| 6,188,870 B1 * | 2/2001 | Glaab | 725/31 |

* cited by examiner

Primary Examiner—Vivek Srivastava
(74) Attorney, Agent, or Firm—Robert E. Bushnell, Esq.

(57) ABSTRACT

A process and network able to restrict a video appliance equipped with either a single tuner or with multiple tuners, from receiving and subsequently displaying video image signals represented by an accompanying broadcast discretionary control data to include a high level of objectional content. A multi-tuner television receiving appliance may be constructed with at least two tuners receiving a program; a viewing restricting portion detecting a discretionary control data of the program received through one of the tuners and blocking AGC signals of the tuner receiving the program when the discretionary control data is greater than a discretionary threshold; a control portion blocking AFT signals of the other tuners when the viewing of the program received the receiving tuner is restricted.

19 Claims, 5 Drawing Sheets

MULTI-TUNER TELEVISION RECEIVING APPARATUS AND METHOD OF RESTRICTING THE VIEWING

CLAIM FOR PRIORITY

This application makes reference to, incorporates the same herein, and claims all benefits accruing under 35 U.S.C. §119 from my Korean Patent Application No. 2000-6163, earlier filed in the Korean Industrial Property Office on the $10^{th}$ of Feb. 2000, the entirety of which is hereby incorporated by reference.

BACKGROUND OF THE INVENTION

1. Field of the Invention

The present invention relates to single and multi-tuner television receiving techniques and apparatus generally, and more particularly, to a process and circuit that enable a user to restrict viewing of selected video image programs of an appliance equipped with either a single or a multiple number of television tuners.

2. Description of the Background Art

Recent proposed changes in federal regulations within the United States mandate that a discretionary control feature, commonly called the "V-chip" function, be incorporated into the design and construction of consumer television receiver circuits. This V-chip function allows a parent or other responsible person discretionary control to block-out television programs that the parent deems to be inappropriate for young viewers. The V-chip function may be implemented by incorporation into one or more dedicated ICs or by inclusion in a microprocessor. The proposed discretionary control feature will be encoded and transmitted to television receivers on the twenty-first (i.e., line 21) line of the 525 horizontal scanned lines that make up one frame of each picture screen. Each transmission of line 21 contains a synchronizing clock burst that is followed by data. The data contained within line 21 also contains closed captioning information to display words (i.e., descriptive text) on the television screen for hearing impaired viewers. Line 21 data further includes discretionary control data with a value representing the level of sex and violence in the corresponding video program that is currently being run. The discretionary control data is fed into the microprocessor or V-chip integrated circuit. The parent pre-sets a discretionary threshold for the television receiver. If the discretionary control data carried by line 21 is less than the discretionary threshold set for the television receiver, then the amount and degree of sex and violence in the currently running program is considered to be acceptable, and the viewer is allowed to watch the program. If the discretionary control data is greater than the discretionary threshold, then the amount and degree of sex and violence in the presently running program is considered to be unacceptable, and the video signal carried by that channel is blanked out, or otherwise made unviewable.

Appliances for watching video programs have been constructed in recent years with multiple tuners. Video appliances constructed with two or more tuners, such as television receivers coupled with video cassette recorders (i.e., a TVCR), have been proposed for example, by Sung-doug Kim in an Apparatus For Performing Programmed Recording Using Broadcast Program Data and Method Therefor In a Two-tuner System, U.S. Pat. No. 6,058,242 issued on the $2^{nd}$ of May 2000. These multi-tuner video appliances are also sometimes referred to as "TV/VCR combos" by retail vendors such as Circuit City.

I have noticed however, that this type of supervisory discretionary control can be implemented out only for video receiving appliances that have a single tuner. Therefore, a viewer can watch a program that carries discretionary control data with a value that is greater than the discretionary threshold by using multiple devices or by using a device equipped with two turners, for example, a TV coupled with a video cassette recorder (e.g., a VCR or a TVCR). In further detail, if the value of the discretionary control data for a program is greater than the discretionary threshold value that has been set by the user of that video appliance, a video signal received through a TV receiving tuner is blanked out or made unviewable, whereas the same program can be recorded onto a video cassette tape through the recording tuner of the VCR. Consequently, I have found that the discretionary control function can not be easily and fully implemented with a video receiving appliance that has more than two tuners such as a TVCR, and that there is a need for a television receiving apparatus that performs the discretionary control function even when the receiving apparatus has more than two tuners such as a TVCR, and a method of restricting the viewing of selected video programs via video receiving appliances that are equipped with multiple tuners.

SUMMARY OF THE INVENTION

It is therefore, an object of the present invention to provide an improved process and apparatus for viewing video programs.

It is another object to provide a process and apparatus able to restrict the viewing of programs via a video appliance that is equipped either with a single tuner or with multiple tuners.

It is a still further object to provide a video display appliance and process for operating the appliance that is equipped either with a single tuner or with multiple tuners, to enable entry of a single restrictive viewing setting to simultaneously control viewing access to video signals that could otherwise be received by any of the multiple tuners.

It is a yet further object to provide a television receiving apparatus that performs a discretionary control function even in video receiving apparatus that is equipped either with a single tuner or with multiple tuners such as a TVCR, and a method of restricting the viewing of programs with such receiving apparatus.

It is still yet a further object to provide a simplified process and circuit able to restrict viewing of video image programs with a video appliance that is equipped either with a single tuner or with tuners independently operable tuners.

These and other objects may be attained with a television receiving apparatus and process that is equipped either with a single tuner or with multiple tuners receiving a program. One stage of the network for the video appliance serves to restrict viewing via the appliance by detecting the discretionary control data for the program that is being received through one of the tuners and by blocking the automatic gain control signals (i.e., the AGC signals) of the tuner that is receiving the program when the discretionary control data is greater than the discretionary threshold. A control stage of the network blocks the automatic fine tuning signals (i.e. the AFT signals) of the other tuners within the appliance when the viewing of the program received by the receiving tuner is restricted by the setting of the discretionary threshold.

Another embodiment of the present invention provides a process for restricting the viewing of video programs of video appliances such as televison receivers, video cassette receivers and read and writing digital video disk players, that are equipped either with a single tuner or with multiple tuners, a viewing restricting stage (or viewing restricting portion) and a control stage. The discretionary control data for the program that is being received through the first tuner is detected, and a comparison is made between the value of the discretionary threshold installed by the user in the appliance and the discretionary control data detected for the video signal being received. A check is made to determine whether a viewer has made a recording command through any of the other tuners of the appliance when the detected discretionary control data that has been received for the program is greater than the installed viewing restriction data. The automatic gain control signals are blocked by the view restricting stage for the first tuner receiving the program when the value indicated by the discretionary control data is greater than the discretionary threshold, and the automatic fine tuning signals for the other tuners are blocked by the control stage when a comparison between the discretionary control data and the discretionary threshold indicates that viewing of the corresponding program being received by the receiving tuner is restricted.

Either a single tuner or a multi-tuner television receiving apparatus may be used as a preferred embodiment of the present invention, so that when the discretionary control data in the currently running program is greater than the discretionary threshold, not only one tuner of the video appliance, but also all of the other tuners of the appliance are blocked, whereupon no one is able to use that appliance to view the program that the parents have deemed to be inappropriate for young viewers. Additionally, since the principles of the present invention may be implemented with a transistor used to block the automatic fine tuning signals in order to lock the other tuners, both the circuit and the operational program for implementing the principles of this invention may be simplified.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
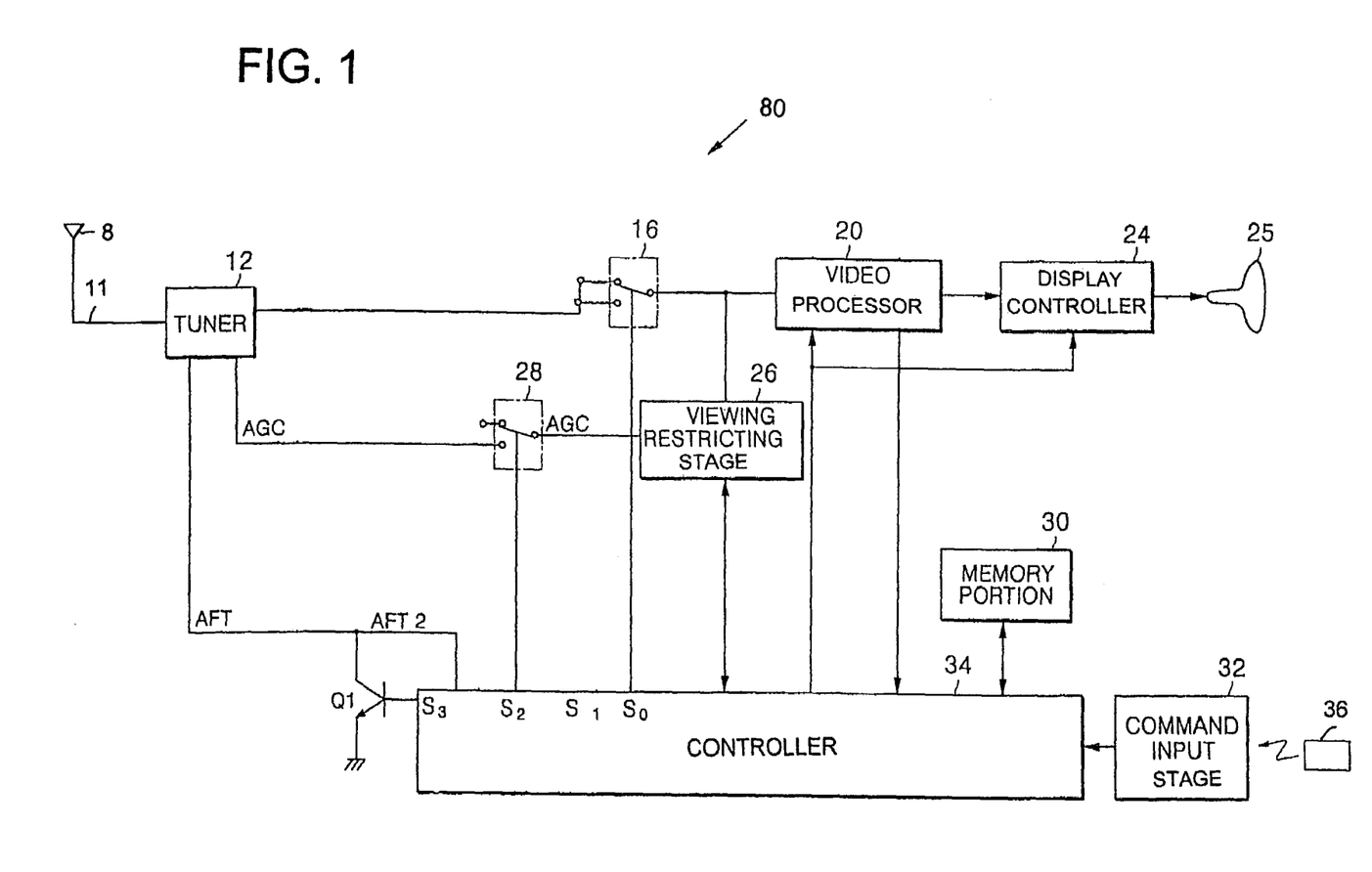
FIG. 1 is a block diagram illustrating a circuit that provides supervisory regulation of the viewing provided by a single tuner television appliance constructed as a preferred embodiment of the present invention.

Embodiments of the present invention will hereinafter be described in detail through a preferred embodiment of the present invention, with reference to the accompanying drawings. FIG. 1 shows a circuit of a television receiver 80 that is equipped with a single tuner 12, constructed according to one design for a preferred embodiment of the present invention. An antenna 8, or some other source of video image signals such as a cable modem, respectively applies either broadcast or cable image video signals via signal lead 11 to tuner 12 that feeds selector 16, a video processor 20, a display controller 24, and a video display 25. Viewing restricting stage 26, selector 28, memory 30 and command input stage 32 are disposed to receive commands and operational instructions from a user as a result of the user's manual manipulations of a multikey keypad on a hand-held remote controller 36, and from a control stage such as a microprocessor based controller 34. The control electrode of a first transistor Q1 is coupled to be driven by signals output from pin $S_3$ of controller 34.

Video image signals that are being received through tuner 12 are selectively provided to video processing stage 20 through selector 16. Optionally, selector 16 may provide a single image signal received via either tuner 12 or via some other source to video processor 20.

Video processor 20 receives image signals from tuner 12 or reproduced image signals from either a VCR or DVD circuit (not shown), and processes the brightness signal components and color signal components of the image signals received, and applies red, green and blue signals (i.e., RGB signals) to display controller 24. Display controller 24 drives a video display device such as a thin film display or a cathode ray tube display 25 that displays RGB image signals on the display portion 25 in response to reception of the synchronizing signals.

Viewing restricting stage 26 detects the presence of discretionary control data, i.e., V-chip data, contained among the data carried by line 21 of the multiple image signals received by video processor 20, and feeds the decoded discretionary control data to controller 34 after decoding the detected discretionary control data. Viewing restricting stage 26 may be constructed as a decoder that provides an output signal to controller 34 that is representative of the discretionary control data carried by line 21. Viewing restricting stage 26 decides whether the discretionary control data has a value that is greater than the discretionary threshold. When a program on line 21 of the multiple images signal has discretionary control data that indicates a value that is greater than the discretionary threshold that has been most recently set by the supervisory user, Viewing restricting stage 26 blocks the AGC voltage for tuner 12 that is receiving that particular program, through selector 28, thereby blocking out the television program corresponding to the discretionary control data that the parent of the young viewer deems to be inappropriate.

The discretionary control data, the discretionary threshold that has been pre-set by a user, a user ID code, and other operational information is written into and read from memory 30 by controller 34.

Controller 34 includes a microcomputer and its peripheral circuit. Controller 34 regulates the operation and performance of all of the components of the TV circuit 80 in response to commands input by the user through command input stage 32. Controller 34 regulates the operation of selector16 via control signals output on terminal $S_0$. Controller 34 also controls the electrical conductivity through the collector-emitter semiconducting path of transistor Q1 by controlling the voltage applied by terminal $S_3$ to the base electrode of transistor Q1 in response to the control provided by Viewing restricting stage 26 in order to mute the AFT signals for tuner 12 when the indicated value of the discretionary control data that accompanies a video program is greater than the discretionary threshold previously stored in memory 30 by the supervisory user of the appliance.

Figure 2:
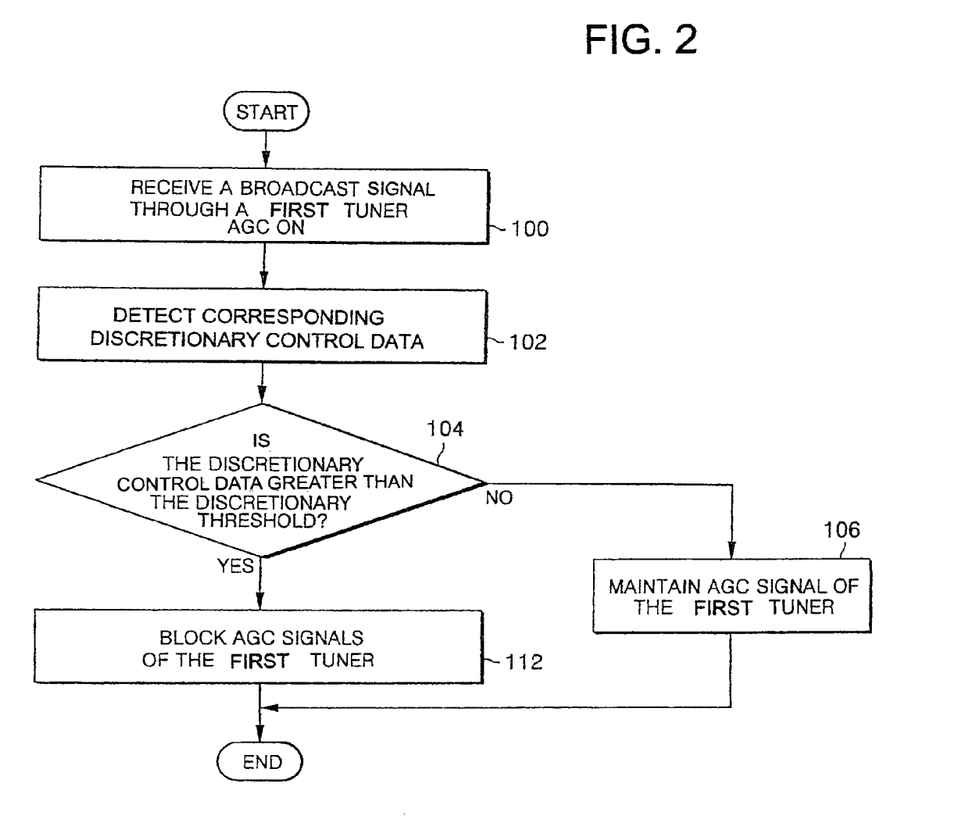
FIG. 2 is a flow chart illustrating one process for operating a single tuner video appliance, as another preferred embodiment of the present invention.

FIG. 2 is a flow chart illustrating one of the several possible operations of a video appliance equipped with one or more discrete tuner stages (e.g., such as video appliance 80 shown in FIG. 1) in accordance with the principles of the present invention. When viewing the video images on display device 25 of a video signal that is received on a channel tuned through tuner 12, the operation to restrict viewing of video images carried by one or more channels is as follows.

During step 100, when the broadcast signal is received through the first tuner 12, controller 34 generates control signals on its terminal $S_0$ to switch selector 16 so that a multiple image signal provided by tuner 12 maybe applied to video processor 20. Controller 34 also generates a control signal at terminal $S_2$ to switch selector 28 to apply the automatic gain control signals AGC for tuner 12. Subsequently, during step 102, the multiple image signal received through tuner 12 is applied to Viewing restricting stage 26 to be decoded to allow detection of the discretionary control data carried by line 21 data. Then, in step 104, controller 34 makes a determination of whether the program currently being received is accompanied by discretionary control data whose value is greater than the discretionary threshold currently stored in memory 30. When the value indicated by the discretionary control data carried by line 21 is less than the discretionary threshold, the AGC signal for tuner 12 is maintained during step 106 "as is" in order to continue application of the AGC signal to the tuner 12 so that the viewer will be allowed to watch the program that corresponds to the discretionary control data.

When the value of the discretionary control data carried by line 21 is greater than the discretionary threshold most recently stored in memory 30, the receiving operation of tuner 12 is locked in step 112 by generation of a control signal $S_2$ to cause selector 28 to block transmission of the AGC signal from tuner 12. As a result, it becomes impossible for the viewer to watch any program of video images through tuner 12 that has a value indicated by its accompanying discretionary control data which is greater than the discretionary threshold.

Figure 3:
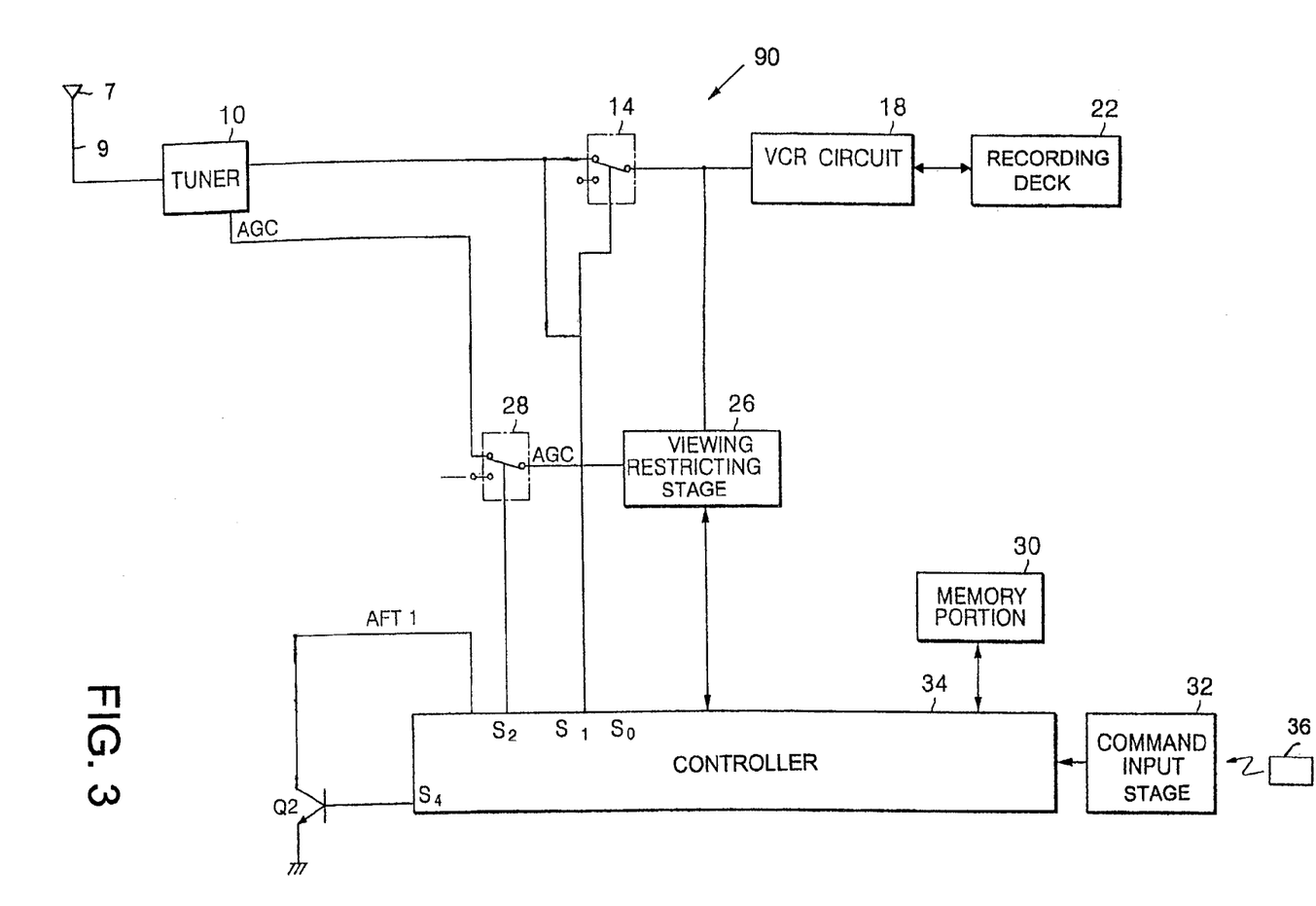
FIG. 3 is a block diagram illustrating a circuit that provides supervisory regulation of the viewing provided by a single tuner VCR constructed as a preferred embodiment of the present invention.

FIG. 3 shows a circuit of a video cassette recorder 90 as an exemplar of another single tuner video appliance constructed according to one design for a preferred embodiment of the present invention, with tuner 10. Antenna 7, or some other source of video image signals such as a cable modem, respectively applying either broadcast or cable video image signals via signal lead 9 to tuner 10. Tuner 10 selectively feeds selector 14, respectively applying either broadcast or cable image video signals via selector 14 to a video cassette recorder circuit (i.e., a VCR circuit) 18. Viewing restricting stage 26, selector 28, memory 30, and command input stage 32 are disposed to receive commands and operational instructions from a user as a result of the user's manual manipulations of a multikey keypad on hand-held remote controller 36. These user commands are sent through command input stage 32 to microprocessor based controller 34. A control electrode transistor Q2 is coupled to be driven by signals output from pin $S_4$ of controller 34.

Video image signals that are being received through tuner 10, are selectively provided to VCR circuit 18 through selector 14. Optionally, selector 14 may provide a single image signal received via either tuner 10 or some other source to both VCR circuit 18 and some other video appliance.

VCR circuit 18 divides the received multiple image signals into brightness signals and color signals, processes the brightness and color signals, and then frequency modulates the brightness and color signals. These frequency modulated brightness and color signals are transferred to a recording deck 22, where the image signals are recorded onto a recording medium such as a video cassette tape. Alternatively, or in addition, a different switch (not shown) may selectively apply the image signals provided by tuner 10 to a DVD recorder for storage on a DVD disk.

Image signals reproduced from the tape by recording deck 22 are FM-demodulated by VCR circuit 18 and then are provided for viewing and entertainment to a video processor for a televison set, such as processor 20 shown in FIG. 1.

View restriction stage 26 detects the presence of discretionary control data, i.e., V-chip data, contained among the data carried by line 21 of the multiple image signals received by video processor 20, and feeds the decoded discretionary control data to controller 34 after decoding the detected discretionary control data. View restriction stage 26 maybe constructed as a decoder that provides an output signal to controller 34 that is representative of the discretionary control data carried by line 21. View restriction stage 26 decides whether the discretionary control data has a value that is less than the discretionary threshold. When a program has discretionary control data that indicates a value that is greater than the discretionary threshold that has been most recently set by the supervisory user, view restriction stage 26 blocks the AGC voltage for tuner 10 that is receiving that particular program, through selector 28, thereby blocking out the television program corresponding to the discretionary control data that the parent of the young viewer deems to be inappropriate.

The discretionary control data, the discretionary threshold that has been pre-set by a user, a user ID code, and other operational information are written into and read from memory 30 by controller 34.

Controller 34 includes a microcomputer and its peripheral circuit. Controller 34 regulates the operation and performance of all of the components of appliance 90 in response to commands input by the user through command input stage 32. Controller 34 regulates the operation of selector 14 via control signals output on terminal $S_1$. Controller 34 also controls the electrical conductivity through the collector-emitter semiconducting path of transistor Q2 by controlling the voltage applied by terminal 54 to the base of transistor Q2 in response to the control provided by Viewing restricting stage 26 in order to mute the AFT signals for tuner 10 when the indicated value of the discretionary control data that accompanies a video program is greater than the discretionary threshold previously stored in memory 30 by the supervisory user of the appliance.

Figure 4:
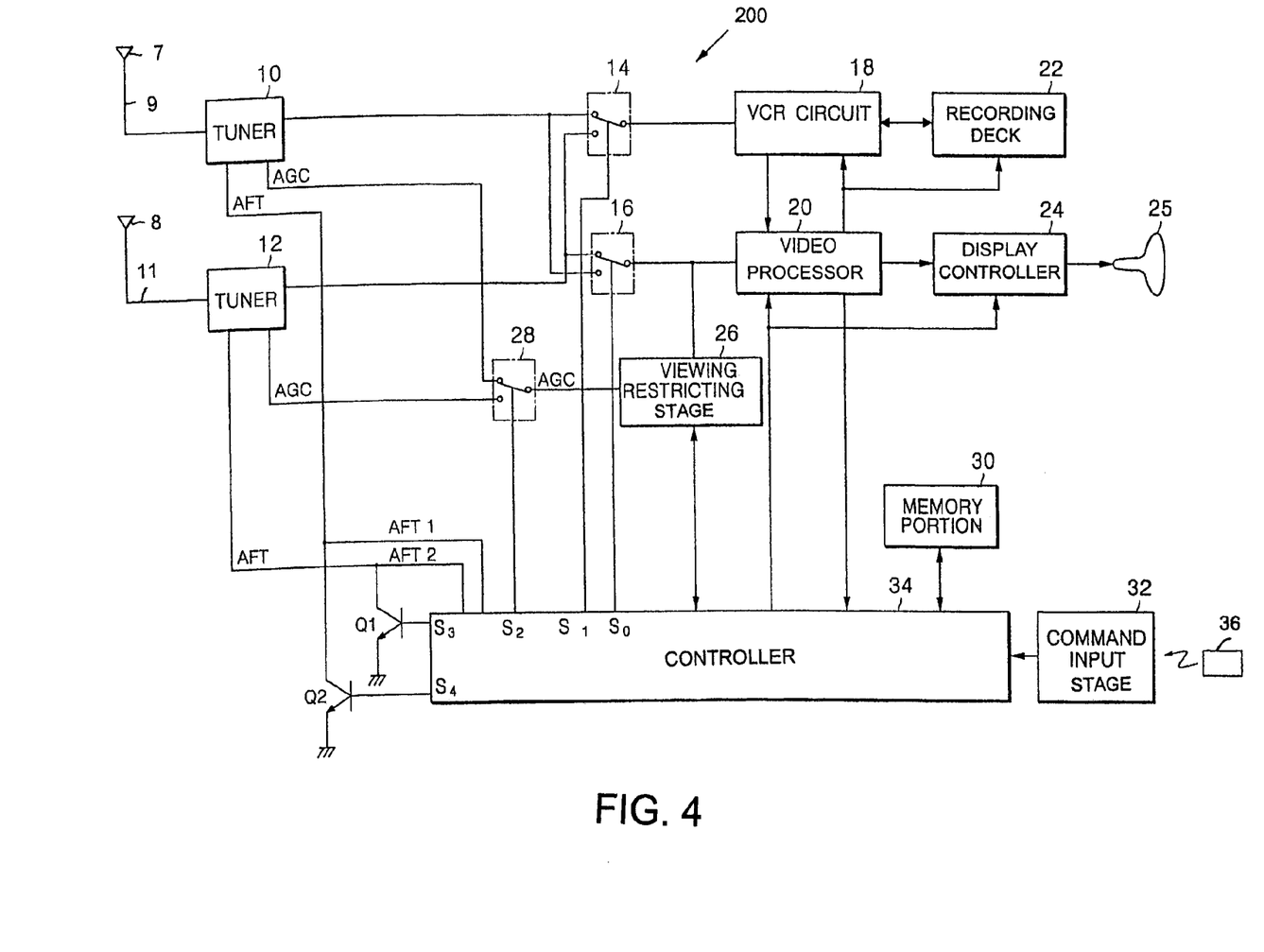
FIG. 4 is a block diagram illustrating a circuit for a two-tuner TVCR constructed as a preferred embodiment of the present invention.

FIG. 4 shows a circuit of a two-tuner TVCR 200 constructed according to one design for a preferred embodiment of the present invention, with two independently operable tuners 10, 12. The two-tuner TVCR includes either a first antenna 7, or some other source of video image signals such as a cable modem, respectively applying either broadcast or cable video image signals via a first signal lead 9 to first tuner 10 that selectively feeds first selector 14 and second selector 16, either a second antenna 8, or some other source of video image signals such as a cable modem, respectively applying either broadcast or cable image video signals via a second signal lead 11 to second tuner 12 that feeds first selector 14 and second selector 16, a video cassette recorder circuit (i.e., a VCR circuit) 18, a video processor 20, a display controller 24, a video display 25, a viewing restricting stage 26, a third selector 28, a memory 30, a command input stage 32 disposed to receive commands and operational instructions from a user as a result of the user's manual manipulations of a multikey keypad for a hand-held remote controller 36, and a control stage such as a microprocessor based controller 34. The control electrode of a first transistor Q1 is coupled to be driven by signals output from pin $S_3$ of controller 34, and the control electrode of a second transistor Q2 is coupled to be driven by signals output from pin $S_4$ of controller 34.

Multiple image signals that are being simultaneously received through different ones of independently variable first and second tuners 10, 12, are selectively provided to VCR circuit 18 through first selector 14 and to video processor 20 through second selector 16. Optionally, selectors 14, 16 may provide a single image signal received via either tuner 10 or tuner 12 to both VCR circuit 18 and video processor 20.

VCR circuit 18 divides the received multiple image signals into brightness signals and color signals, processes the brightness and color signals, and then frequency modulates the brightness and color signals. These frequency modulated brightness and color signals are transferred to a recording deck 22, where the image signals are recorded onto a recording medium such as a video cassette tape. Alternatively, or in addition, a different switch (not shown) may selectively apply the image signals provided by tuners 10, 12 to a DVD recorder for storage on a DVD disk.

Image signals reproduced from the tape by recording deck 22 are FM-demodulated by VCR circuit 18 and then are provided to video processor 20. Video processor 20 receives multiple image signals from either tuners 10, 12 or reproduced image signals from VCR circuit 18, or from another source of reproduction such as a DVD player (not shown), and processes the brightness signal components and color signal components of the image signals received, and applies red, green and blue signals (i.e., RGB signals) to display controller 24. Display controller 24 drives a video display device such as a thin film display or a cathode ray tube display 25 that displays RGB image signals on the display portion 25 in response to reception of the synchronizing signals.

Viewing restricting stage 26 detects the presence of discretionary control data, i.e., V-chip data, contained among the data carried by line 21 of the multiple image signals received by video processor 20, and feeds the decoded discretionary control data to controller 34 after decoding the detected discretionary control data. Viewing restricting stage 26 may be constructed as a decoder that provides an output signal to controller 34 that is representative of the discretionary control data carried by line 21. Viewing restricting stage 26 decides whether the discretionary control data has a value that is greater than the discretionary threshold. When a program has discretionary control data that indicates a value that is greater than the discretionary threshold that has been most recently set by the supervisory user, Viewing restricting stage 26 blocks the AGC voltage for the corresponding tuners 10, 12 that are receiving that particular program through third selector 28, thereby blocking out the television program corresponding to the discretionary control data that the parent of the young viewer deems to be inappropriate.

The discretionary control data, the discretionary threshold that has been pre-set by a user, a user ID code, and other operational information is written into and read from memory 30 by controller 34.

Controller 34 includes a microcomputer and its peripheral circuit. Controller 34 regulates the operation and performance of all of the components of the TVCR circuit in response to commands input by the user through command input stage 32. Controller 34 regulates the operation of selectors 14, 16 via control signals output on its terminals $S_1$, $S_0$, respectively. Controller 34 also controls the electrical conductivity through the collector-emitter semiconducting path of first and second transistors Q1, Q2 by controlling the voltages applied by terminals $S_3$, $S_4$ to the respective base electrodes of transistors Q1, Q2 in response to the control provided by view restriction stage 26 in order to mute the AFT signals for either of the two tuners 10, 12 when the indicated value of the discretionary control data that accompanies a video program is greater than the discretionary threshold previously stored in memory 30 by the supervisory user of the appliance.

Figure 5:
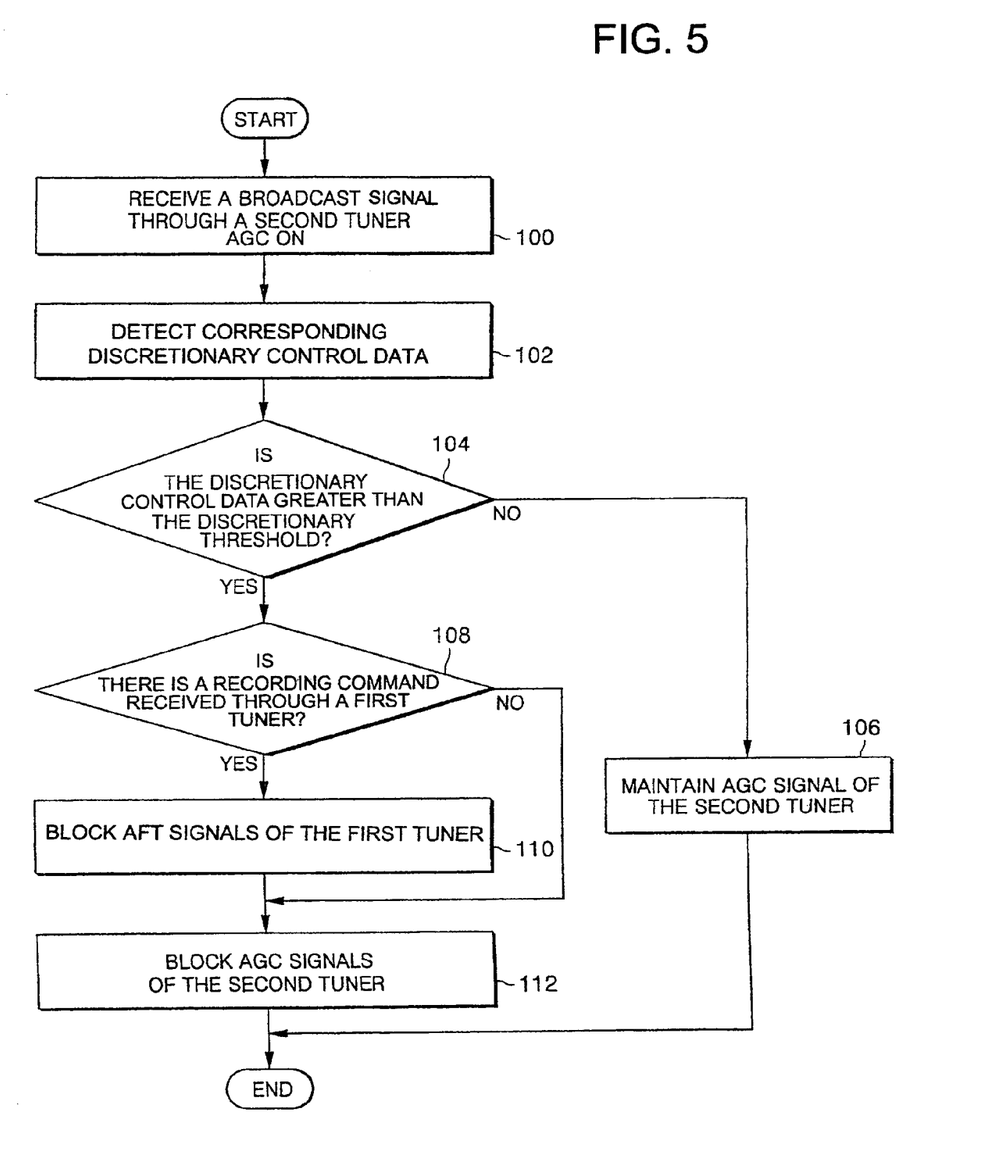
FIG. 5 is a flow chart illustrating one process for operating a two-tuner TVCR, as another preferred embodiment of the present invention.

FIG. 5 is a flow chart illustrating one of the several possible operations of the two-tuner TCVR equipped with two, or more discrete tuner stages (e.g., such as the embodiment shown in FIG. 4) in accordance with the principles of the present invention. When viewing the video images on display device 25 of a video signal that is received on a channel tuned through second tuner 12 and simultaneously recording a channel selected through first tuner 10 by using the VCR, the operation to restrict viewing of video images carried by one, or more channels is as follows.

During step 100, when the broadcast signal is received through second tuner 12, controller 34 generates control signals on its terminals $S_0$ and $S_1$ respectively to switch second selector 16 so that a multiple image signal provided by second tuner 12 may be applied to video processor 20, and to switch first selector 14 so that a multiple image signal provided by first tuner 10 may be applied to VCR circuit 18. Controller 34 also generates a control signal at terminal $S_2$ to switch third selector 28 to apply the automatic gain control signals AGC for second tuner 12. Subsequently, during step 102, the multiple image signal received through second tuner 12 is applied to view restriction stage 26 to be decoded to allow detection of the discretionary control data carried by line 21 data. Then, in step 104 controller 34 makes a determination of whether the program currently being received is accompanied by discretionary control data that indicates a value that is less than the discretionary threshold currently stored in memory 30. When the value indicated by the discretionary control data carried by line 21 is less than the discretionary threshold, the AGC signal of the second tuner 12 is maintained during step 106 "as is" in order to continue application of the AGC signal to the second tuner so that the viewer will be allowed to watch the program that corresponds to the discretionary control data.

When the value of the discretionary control data carried by line 21 is greater than the discretionary threshold most recently stored in memory 30, controller 34 makes a check during step 108 to determine whether a recording command has been received for the same channel through first tuner 10. When no recording command is determined by step 108 to have been received for the first tuner, the receiving operation of second tuner 12 is locked in step 112 by generation of a control signal $S_2$ to cause third actuator 28 of block transmission of the AGC signal to second tuner 12. As a result, it becomes impossible for the viewer to watch any program of video images through second tuner 12 that has a value indicated by its accompanying discretionary control data that is greater than the discretionary threshold.

When a recording command is received by controller 34 from command input stage 32 for the same channel as is currently being received through the second tuner, the control voltage applied to the base of transistor Q1 by terminal S₃ turns transistor Q1 on so that AFT signals for second tuner 12 are shunted to either ground or to a local reference potential by the collector-emitter path of transistor Q1 and the reception of that channel via second tuner 12 is blocked in step 110, thus locking the receiving operation of the multiple tuner appliance and thereby restricting reception to only those channels that are received through first tuner 10. At the same time, during step 112 the AGC signals of the second tuner 12 are also blocked by third selector 28, thereby preventing second tuner 12 from being used to receive any channel when the value of the discretionary control data carried by line 21 of a video image signal on that channel is greater than the discretionary threshold most recently stored in memory 30. Therefore, it is impossible to record and view any program having discretionary control data that is greater in value than the discretionary threshold through either the first or the second tuners 10 and 12.

As described herein before, using the multi-tuner television receiving apparatus according to the preferred embodiment of the present invention, when the discretionary control data in the presently running program is greater than the discretionary threshold, not one tuner but also all of the other tuners in the video appliance are locked, whereupon the viewer is unable to view any program that parents deem inappropriate for young viewers. In addition, since transistor Q1 blocks transmission of the AFT signals between controller 34 and second tuner 12 to lock operation of second tuner 12, the operational program of the video appliance is substantially simplified.

While the present invention has been described with respect to the particular embodiments, it will be apparent to those skilled in the art that various changes and modifications may be made without departing from the spirit and scope of the invention as defined in the following claims. By way of example, either the circuit illustrated by FIG. 1 or the circuit illustrated by FIG. 3 may be equipped with two selectors 14, 16, and two transistors Q1, Q2, to be operationally coupled with a video signal appliance such as a second VCR, or a television, so that controller 34 may be used to simultaneously restrict video viewing and video signal recording by both appliances whenever the discretionary control data of a video program that is being selectively received by one of the tuners is greater than a discretionary threshold.

What is claimed is:

1. A video signal apparatus, comprising:
   at least two tuners receiving a program;
   a viewing restricting portion detecting a discretionary control data of the program received through one of the tuners and blocking AGC signals of the tuner receiving the program when the discretionary control data is greater than a discretionary threshold; and
   a control portion blocking AFT signals of the other tuners when the viewing of the program received by the receiving tuner is restricted.

2. The multi-tuner television receiving apparatus of claim 1, further comprised of said tuners being independently tunable to simultaneously receive different video signals corresponding to different programs.

3. The multi-tuner television receiving apparatus of claim 1, further comprised of said plurality of tuners being independently tunable to simultaneously receive identical video signals corresponding to said program.

4. A viewing restricting method of a video signal apparatus, the method comprising:
   detecting discretionary control data of program received through a first tuner of the video signal apparatus, said video signal apparatus comprising a second tuner that is adjustable independently of said first tuner to receive video signals simultaneously with said first tuner from any channel selected by said second tuner, a viewing restricting portion and a control portion;
   comparing a viewing restricting data installed with a detected data;
   checking whether there is a recording command through other tuners in the video signal apparatus when a received data of the program received through the first tuner is greater than the installed viewing restricting data;
   blocking AGC signals of the first tuner receiving the program by the viewing restricting portion when the discretionary control data is greater than a discretionary threshold; and blocking AFT signals of the second tuner by the control portion when the viewing of the program received through the first tuner is restricted.

5. A video signal apparatus, comprising:
   a plurality of tunable tuners that may be tuned to simultaneously receive video signals carrying discretionary control data;
   a first circuit controlling transmission of automatic fine tuning signals to a first one of said tuners;
   a second circuit controlling transmission of automatic gain control signals to said tuners;
   an input stage accommodating entry of discretionary threshold data selectively provided by a user;
   a viewing restricting stage connected to said tuners to detect said discretionary control data accompanying video signals received by said first one of said tuners; and
   a controller coupled to read said discretionary threshold data from a memory and control application of said automatic fine tuning signals to said plurality of tuners in dependence upon comparisons between said discretionary control data accompanying video signals received by said first one of said tuners and said threshold data.

6. The multi-tuner television receiving apparatus of claim 5, further comprised of said plurality of tuners being independently tunable to simultaneously receive different corresponding said video signals.

7. The multi-tuner television receiving apparatus of claim 5, further comprised of said plurality of tuners being independently tunable to simultaneously receive identical said video signals.

8. The multi-tuner television receiving apparatus of claim 5, further comprised of said controller being connected to control application of said automatic fine tuning signals by said first circuit to a second one of said tuners in dependence upon a comparison of between said discretionary control data and said discretionary control data accompanying said video signals received by said second one of said tuners.

9. The multi-tuner television receiving apparatus of claim 5, further comprised of said controller blocking application of said automatic fine tuning to tuners other than said first tuner when a comparison between said discretionary control data accompanying video signals received by said first one of said tuners and said threshold data indicates that reception of said video signals by said first one of said tuners is restricted.

10. The multi-tuner television receiving apparatus of claim 6, further comprised of said controller blocking application of said automatic fine tuning to tuners other than said first tuner when a comparison between said discretionary control data accompanying video signals received by said first one of said tuners and said threshold data indicates that reception of said video signals by said first one of said tuners is restricted.

11. The multi-tuner television receiving apparatus of claim 7, further comprised of said controller blocking application of said automatic fine tuning to tuners other than said first tuner when a comparison between said discretionary control data accompanying video signals received by said first one of said tuners and said threshold data indicates that reception of said video signals by said first one of said tuners is restricted.

12. A video signal apparatus, comprising:
   a tuner that is adjustable to selectively receive video signals representing a program of video images and to receive discretionary control data carried by said video signals; and
   a viewing restricting stage detecting said discretionary control data of the program received through said tuner and blocking automatic gain control signals for said tuner receiving the program when the discretionary control data is greater than a discretionary threshold, said viewing restricting stage being adapted to also block automatic fine tuning signals of the tuner when said discretionary control data is greater than said discretionary threshold.

13. The video signal apparatus of claim 12, further comprised of an additional tuner, with said viewing restricting stage blocking AFT signals of the both of said tuners when said discretionary control data is greater than said discretionary threshold.

14. The video signal apparatus of claim 12, further comprised of an additional tuner, with both of said tuners being independently tunable to simultaneously receive different video signals corresponding to different programs.

15. The video signal apparatus of claim 12, further comprised of an additional tuner, with both of said tuners being independently tunable to simultaneously receive identical video signals corresponding to said program.

16. The video signal apparatus of claim 12, the discretionary control data being based on an amount of sex and violence in said program.

17. The video signal apparatus of claim 12, the discretionary threshold being set at a receiving end of said program and not at a sending end of said program, the discretionary threshold blocking received programs with an excessive amount of sex and violence.

18. The video signal apparatus of claim 12, the discretionary threshold being a parental control.

19. The video signal apparatus of claim 12, the video signal apparatus being adapted to both block the viewing of a program and block the recording of said program when the discretionary control data is greater than a discretionary threshold.

* * * * *